N. H. GROFF.
TOOL HOLDER.
APPLICATION FILED APR. 17, 1918.
1,287,971.
Patented Dec. 17, 1918.
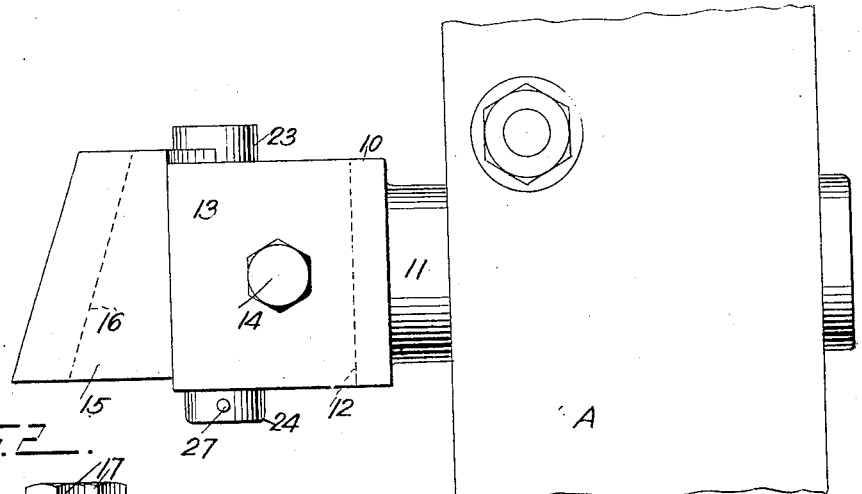
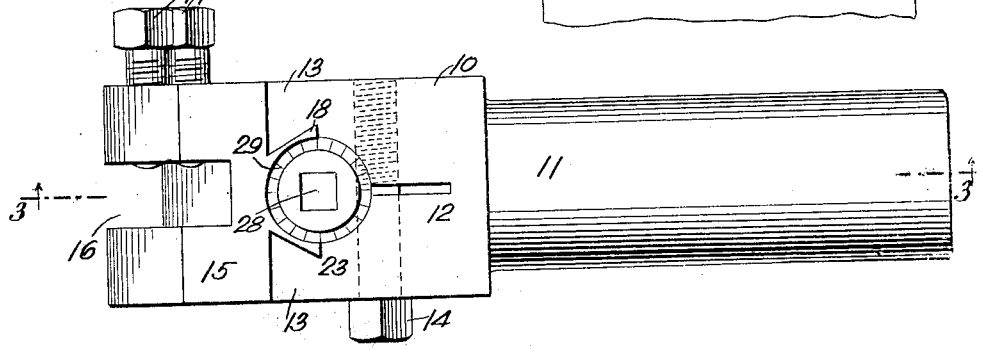
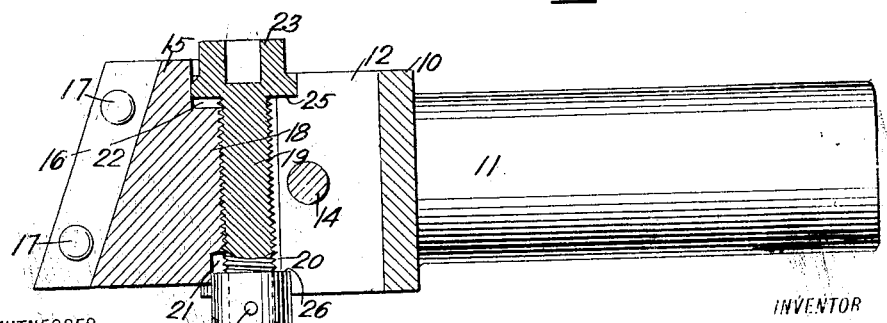
INVENTOR
Noah H. Groff

UNITED STATES PATENT OFFICE.

NOAH H. GROFF, OF ARDMORE, PENNSYLVANIA.

TOOL-HOLDER.

1,287,971.  Specification of Letters Patent.  Patented Dec. 17, 1918.

Application filed April 17, 1918. Serial No. 229,089.

*To all whom it may concern:*

Be it known that I, NOAH H. GROFF, a citizen of the United States, and a resident of Ardmore, in the county of Montgomery and State of Pennsylvania, have invented a new and Improved Tool-Holder, of which the following is a description.

My invention relates to tool holders and relates more particularly to that form of tool holder employing a cross slide arranged to receive the tool, and adapted to be adjusted transversely to the axis of rotation of the holder. The invention especially is intended for embodiment in that type of tool holder adapted to be held in a block carried on a revolving turret which moves toward the work, the work being rotated in or by a chuck or the like.

The prime object of my invention is to provide means of simple construction and arrangement for adjusting the cross slide and means to secure the slide in adjusted position in a manner that a micrometric adjustment may be readily effected, and the cross slide rigidly clamped in the adjusted position and without liability of disturbing the adjustment while clamping.

Reference is to be had to the accompanying drawings forming a part of this specification.

Figure 1 is a side elevation of a tool holder embodying my invention;

Fig. 2 is a plan view thereof;

Fig. 3 is a longitudinal vertical section on the line 3—3, Fig. 2.

My improved tool holder includes a head 10 having means to secure it to a driving mechanism, there being shown a shank 11 adapted to be secured to a block A of a turret, a portion of said block being conventionally indicated in Fig. 1. The head 10 is slotted longitudinally at the center as at 12 and recessed in front of the slot, thereby producing clamp jaws 13 which are oppositely beveled on their inner faces at the front portions of the jaws, thereby forming a dove-tail slideway. A transverse clamp screw 14 extends through the head 10 in a bore transecting the slot 12, said screw acting to draw the jaws 13 together for clamping.

A cross slide 15 on the front of the head 10 is adapted to receive a tool (not shown), for which purpose said cross slide has a groove or slot 16 in the front, there being laterally disposed clamp screws 17 to bind the tool in position. The cross slide 15 has on the back thereof a dove-tail rib 18 adapted to be engaged by an adjusting screw 19 disposed transversely to the axis of the holder, at right angles to the clamp screw 14. The screw 19 is accommodated in a bore 20 formed partially in the head 10 between the jaws 13 and partially in the dove-tail rib 18, said rib having thread members to engage the threads of the screw 19, whereby said rib constitutes a half nut. At the ends of the bore 20 counter-bores 21, 22 are produced. On one end of the adjusting screw 19 is a head 23 and on the opposite end is threaded a collar 24 which is fixed in the adjusted position by a cotter pin 27 or the like. The head 10 at the ends of the bore 20 presents shoulders or counter-bores 25, 26 against which the inner sides of the head 23 and collar 24 come to a bearing, whereby to prevent any longitudinal movement of the screw 19 relatively to the head 10.

The bottom walls of the counter-bores 21, 22 are adapted to engage respectively the inner faces of the head 23 or the collar 24 to limit the adjustment of the cross slide 15 by the turning of the adjusting screw 19. For turning said screw any means may be provided, the head 23 in the illustrated example having a squared socket 28 to receive a squared wrench head. On the head 23 of the screw at the base thereof is an annular series of graduations 29, the number of said graduations and the pitch of the threads on the screw determining the fineness of adjustment.

With the described construction it will be seen that a turning of the screw 19 may effect any desired transverse adjustment of the tool holding cross slide 15 and the cross slide having been accurately adjusted the slight turning up of the clamp bolt 14 will firmly bind the jaws 13 onto the rib 18, thereby securely holding the cross slide in any given adjustment.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desired to secure by Letters Patent:—

1. A tool holder including a head, means to secure the same to the driving mechanism, said head having a central longitudinal slot and being recessed in front of the slot thereby forming yieldable jaws on the head, the opposed inner faces of the jaws at the front ends thereof being oppositely beveled forming a dove-tail slideway, a cross slide, means to clamp a tool in said cross slide at the front thereof, a dove-tail rib on the back of the cross slide and fitting said slideway, said head, between the jaws thereof, and the said dove-tail block having a bore transverse to the axis of the tool and extending partially in the head and partially in said rib, said rib having thread members thereon at said bore to constitute a half nut, there being counter-bores at the ends of said bore, an adjusting screw in said bore and engaging the threads on the dove-tail rib to shift the cross slide by a turning of the screw, a head on one end of said screw, a removable collar on the opposite end of the screw, the bottom walls of said counter-bores being adapted to engage said head and collar, respectively, to limit the adjustment of the cross slide, and a clamp screw passing transversely through the head at its slotted portion at right angles to the adjusting screw to clamp the jaws onto the dove-tail rib when the cross slide is adjusted.

2. In a tool holder, a head adapted to be secured to a driving mechanism, dove-tail clamp jaws on the head at the front and integral therewith, a cross slide on the head at the front adapted to hold a tool, a dove-tail rib on the cross slide between said jaws, a transverse adjusting screw partially accommodated in said rib and partially in said head between the jaws, the threads of the screw being out of engagement with said head, coacting means respectively on the ends of said screw and on said head to hold the screw against longitudinal movement, said rib having thread members and constituting a half nut, and a clamp screw for the jaws and extending transversely thereto at right angles to the adjusting screw.

NOAH H. GROFF.